June 10, 1952

S. T. STEFFEN 2,600,028

BALE-LOADING MACHINE

Filed May 5, 1950

INVENTOR.
SAMUEL T. STEFFEN,
BY
McMorrow, Berman & Davidson
ATTORNEYS.

Patented June 10, 1952

2,600,028

UNITED STATES PATENT OFFICE 2,600,028

BALE-LOADING MACHINE

Samuel T. Steffen, Fairbury, Ill.

Application May 5, 1950, Serial No. 160,249

2 Claims. (Cl. 198—7)

This invention relates to loading machines for loading baled hay and straw, and more particularly to a machine for loading bales which are cylindrical in shape.

A main object of the invention is to provide a novel and improved bale-loading machine which is simple in construction, which is adapted to handle cylindrical bales, and which is arranged so that the machine will handle the bales without turning the bales to a lengthwise position, as required in bale-loading machines of the prior art.

A further object of the invention is to provide an improved loading machine for cylindrical bales of hay, straw and the like, said machine being relatively inexpensive to manufacture, being rugged in construction, being adapted to be attached to a conventional tractor, and arranged so that the bales loaded thereon are not damaged and the twine wrapped around the bales remains intact during loading.

A still further object of the invention is to provide an improved loading machine for handling cylindrical bales, said machine being provided with novel conveyor means for efficiently handling the bales.

Further objects and advantages of the invention will become apparent from the following description and claims, and from the accompanying drawings, wherein:

Figure 1:
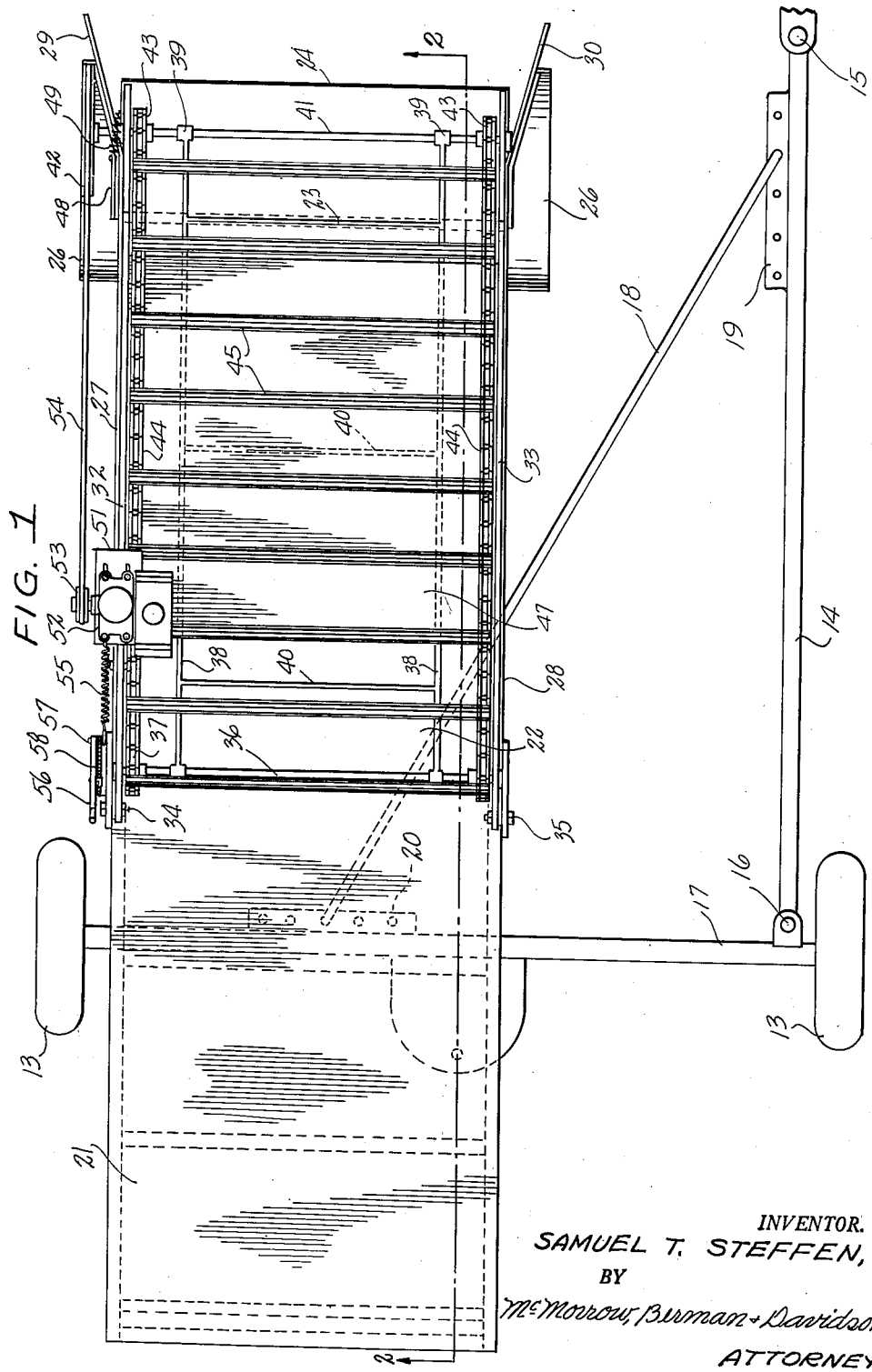
Figure 1 is a top plan view of an improved bale-loading machine constructed in accordance with the present invention.

Referring to the drawings, the machine is designated generally at 11 and comprises a supporting frame 12 mounted on ground-engaging wheels 13, 13, the frame having a laterally offset drawbar 14 adapted to be hitched to the rear end of a tractor at 15. As shown in Figure 1, the drawbar 14 is pivotally connected at 16 to the axle housing 17, said axle housing forming part of the frame 12 and containing the axle to which the wheels 13, 13 are secured. Designated at 18 is a diagonal, tubular brace rod which is adapted to be connected to respective multiple-apertured brackets 19 and 20 carried by the bar 14 and the housing 17, as shown in Figure 1, whereby the bar 14 may be secured to the axle housing 17 at any desired position of angular adjustment with respect thereto, the brace rod 18 being arranged for connection to the brackets 19 and 20, and selected apertures of said brackets.

Secured to the top of the frame 12 is a platform 21 which slopes downwardly and forwardly at 22. Hinged to the forward edge of the sloping portion 22 by a transverse hinge pin 23 is an upwardly concave, transversely extending, ground-engaging scoop member 24 arranged to pick up cylindrical bales, such as the bale shown in dotted view at 25, responsive to forward movement of the machine. The forward end of the frame 12 is supported on skids 26 secured to the frame.

Figure 2:
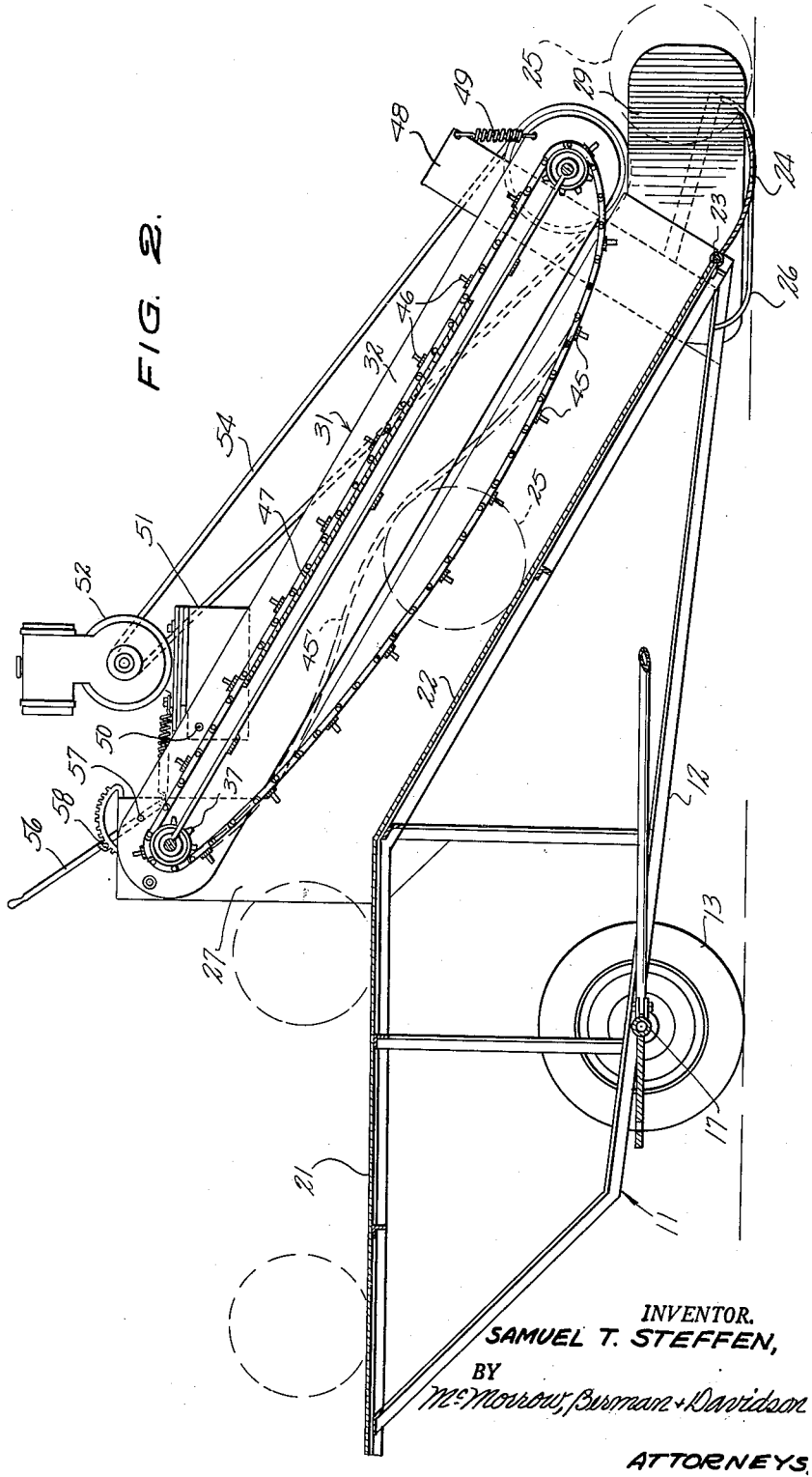
Figure 2 is a longitudinal, cross-sectional view taken on the line 2—2 of Figure 1.

Rigidly secured to the frame on each side thereof are the upstanding side walls 27, 28, said side walls being outwardly flared at the forward end of the machine, as shown at 29 and 30. Designated generally at 31 is a longitudinally extending conveyor frame comprising longitudinal side plates 32, 33 pivoted respectively at 34 and 35 to the upper rear end portions of the side walls 27 and 28. Designated at 36 is a transverse shaft member secured between the rear end portions of the side plates 32 and 33 and having sprockets 37 rotatably mounted on its end portions, inwardly adjacent the side plates 32, 33. Secured to the shaft member 36 are the longitudinally extending bars 38, 38, said bars extending forwardly for substantially the length of the conveyor unit 31 and terminating in transversely aligned bearing sleeves 39, 39. The bars 38, 38 are connected by spaced, transverse bar members 40, thereby defining a rigid framework extending substantially in the plane of the conveyor unit 31. Designated at 41 is a transverse shaft extending through the bearing sleeves 39, 39 and extending rotatably through the conveyor side plates 32, 33. Secured on one end of the shaft 41 is a pulley 42. Secured on the shaft 41 inwardly adjacent the conveyor side plates 32, 33 are the respective sprockets 43, 43. Engaged on the sprockets 37 and 43 on each side of the conveyor unit 31 are the respective sprocket chains 44, 44, and connecting said chains are the longitudinally spaced, transverse bar members 45. Each bar member 45 is formed with an upstanding, outwardly projecting rib 46. The sprocket chains 44, 44 and the transversely extending bar members 45 thereby define a conveyor belt having projections at longitudinally spaced intervals defined by the transverse, outwardly projecting ribs 46. Secured between the vertical side plates 32, 33 is a plate member 47 which extends for a substantial portion of the intermediate length of the conveyor unit 31 and underlies the upper portion of the conveyor belt above defined, supporting said belt for sliding movement. The plate member 47 extends parallel to the framework defined by the bars 38, 38 and 40, as shown in Figure 2, and is elevated slightly above said framework so as to underlie the top portion of the conveyor belt. The lower portion of the conveyor belt is suspended above the inclined platform portion 22.

Projecting outwardly from the forward portion of the stationary side wall 27 is an upwardly extending plate member 48, and connecting the forward end of the conveyor side plate 32 to the top portion of the member 48 is a spring 49 which supports the forward end of the conveyor unit 31. Pivoted at 50 to the upper portion of the side plate 32 is a motor-supporting frame 51 on which is mounted the prime motor 52, which may be, for example, an internal combustion engine. Designated at 53 is the output drive pulley of the motor, said pulley being coupled to the pulley 42 by a belt 54. Designated at 55 is a spring which connects the motor frame 51 to the lower end of a lever 56, said lever being pivoted at 57 to the upper portion of the side wall 27, and being provided with conventional locking means designated at 58 for releasably securing the lever in a desired position of adjustment. The lever 56 provides a means of adjusting the tension of the belt 54, inasmuch as the motor frame 51 may be rotated counterclockwise, as viewed in Figure 2, by rotating the lever 56 clockwise, thereby tightening the belt 54. When the lever 56 is adjusted to its extreme counterclockwise position of adjustment, as shown in Figure 2, the spring 50 exerts minimum restraining force on the motor frame 51, and said frame moves clockwise to a position wherein the belt 54 is loose and wherein no torque is transmitted to the pulley 42 by the motor 52.

In operation of the device, the machine is drawn forwardly by a suitable tractor hitched to the bar 14, and the bales lying on the ground are engaged on the shallow scoop member 24 by allowing the bales to be rolled onto the scoop member responsive to the forward movement of the machine. When the bales have been rolled onto the scoop member 24, the upper portions of the bales are engaged by the transverse ribs 46 carried by the conveyor belt, said belt being driven in a clockwise direction, as viewed in Figure 2, by the motor 52. The belt projections 46 engage the upper portions of the bales 25 and cause the bales to be rolled up on the inclined platform portion 22, the belt being deflected upwardly, as shown for example at 45' in Figure 2. Since the portion of the belt which engages the bales 25 is yieldable, the bales are not damaged by being rolled up the inclined platform portion 22, nor are the twine wrappings around the bales disturbed or broken by engagement of the belt therewith. The machine, therefore, operates to elevate the bales up the inclined portion 22 onto the elevated rear end portion of the platform 21 in position for discharge into a suitable truck or wagon.

It will be seen that the bales may be engaged by the machine in transverse direction with respect to the direction of travel of the machine and do not have to be turned to longitudinally directed positions to ascend the inclined portion 22 of the platform of the loader. This is an important feature, inasmuch as baling machines of present design leave the bales lying crosswise in the field. By the above-described arrangement of applicant's device, applicant's machine may follow the baling machine without requiring any intermediate handling of the bales. If there are two bales lying close together, the tractor operator merely releases the tractor driving clutch and allows one bale to roll up on the inclined portion 22 of the baling machine, and then re-engages the clutch of the tractor to move the machine forwardly, whereby the next bale may be elevated by the machine.

While a specific embodiment of an improved loading machine for loading baled hay, straw and the like has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A loader for cylindrical bales comprising a main frame, an inclined platform carried by said main frame and extending upwardly and rearwardly from the forward end thereof, a pair of wheels, and means supportingly connecting said wheels to said main frame adjacent the rear end of the main frame, a transversely extending upwardly concaved scoop member hinged to the forward end of said platform and being substantially in ground engagement, skid means supporting said forward end, a longitudinally extending conveyor frame pivoted at its rear end to said main frame above said platform for swinging movement around a transverse axis, a movable endless conveyor belt carried by said conveyor frame above said platform, spaced outwardly projecting transverse elements carried by said belt, the lower outwardly projecting elements of said belt being cooperable with said platform to roll a bale upwardly on the platform responsive to movement of the belt, the lower portion of the belt being suspended a short distance above the inclined platform, a portion of the main frame being located above the forward end of the conveyor frame, spacing means connecting the forward end of said conveyor frame to said last-named portion, a mount pivotally supported by said conveyor frame, driving means for said belt carried by said mount, and spring means supporting said mount.

2. A loader for cylindrical bales comprising a wheeled main frame, an inclined platform carried by said main frame and extending upwardly and rearwardly from the forward end thereof, a transversely extending upwardly concaved scoop member hinged to the forward end of said platform and being substantially in engagement with the ground, a longitudinally extending conveyor frame pivoted at its rear end to said main frame above said platform for swinging movement around a transverse axis, a movable endless conveyor belt carried by said conveyor frame above said platform, spaced outwardly projecting transverse elements carried by said belt, a transversely extending plate secured to said conveyor frame and underlying the upper portion of the conveyor belt, the lower outwardly projecting elements of said belt being cooperable with said platform to roll a bale upwardly on the platform responsive to movement of the belt, the lower portion of the belt being spaced a short distance above the inclined platform, means yieldably supporting the forward end of the conveyor frame above said scoop member, and means for driving said conveyor belt, said last-named means comprising a platform pivoted to said conveyor frame, a driving motor on said last-named platform, a drive belt connecting the driving means to the conveyor belt, spring means biasing said last-named platform to drive belt-tensioning position, and means for adjusting the spring means to disengage said drive belt.

SAMUEL T. STEFFEN.

REFERENCES CITED

The following references are of record in the file of this patent:

UNITED STATES PATENTS

| Number | Name | Date |
|---|---|---|
| 986,717 | Johnson | Mar. 14, 1911 |
| 1,009,821 | Albertson | Nov. 28, 1911 |
| 1,200,092 | Elliott | Oct. 3, 1916 |
| 1,289,169 | Henderson | Dec. 31, 1918 |
| 1,460,172 | Nelson | June 26, 1923 |
| 1,520,165 | Witcombe | Dec. 23, 1924 |
| 2,208,128 | Holbrook | July 16, 1940 |
| 2,518,083 | Sims | Aug. 8, 1950 |
| 2,539,689 | Bobrowski | Jan. 30, 1951 |